(12) United States Patent
Xiao et al.

(10) Patent No.: US 12,744,466 B2
(45) Date of Patent: Sep. 22, 2026

(54) SYNCHRONOUS RECTIFICATION SWITCHING POWER SUPPLY CIRCUIT AND PRIMARY SWITCH TUBE CONTROL METHOD

(71) Applicant: Huayuan Semiconductor (Shenzhen) Limited Company, Shenzhen (CN)

(72) Inventors: Haibin Xiao, Shenzhen (CN); Mouyan Teng, Shenzhen (CN); Chunming Guo, Shenzhen (CN)

(73) Assignee: Huayuan Semiconductor (Shenzhen) Limited Company, Shenzhen (CN)

( * ) Notice: Subject to any disclaimer, the term of this patent is extended or adjusted under 35 U.S.C. 154(b) by 160 days.

(21) Appl. No.: 18/742,572

(22) Filed: Jun. 13, 2024

(65) Prior Publication Data

US 2024/0421718 A1 Dec. 19, 2024

(30) Foreign Application Priority Data

Jun. 14, 2023 (CN) ........................ 202310709462.X

(51) Int. Cl.
*H02M 3/335* (2006.01)

(52) U.S. Cl.
CPC ............................... *H02M 3/33592* (2013.01)

(58) Field of Classification Search
CPC ................................................ H02M 3/33592
USPC ........................................... 363/21.14, 21.16
See application file for complete search history.

(56) References Cited

U.S. PATENT DOCUMENTS 11,757,367 B2 * 9/2023 Wong ................ H02M 3/33592 363/21.14
2016/0181934 A1 * 6/2016 Kikuchi ............ H02M 3/33523 363/21.14
2016/0329819 A1 11/2016 Chen et al.
2019/0013727 A1 * 1/2019 Ke .......................... H02M 1/08

FOREIGN PATENT DOCUMENTS

CN 212677084 U 3/2021
CN 114142733 A 3/2022
CN 115118131 A 9/2022
CN 220156500 U 12/2023

OTHER PUBLICATIONS

Examination Report, issued in CN202310709462.X (priority application), by CNIPA, dated Apr. 11, 2026.
Design of a Low-Stress, Hign-Efficiency Asymmetric Half-Bridge Converter, written by Yao Yueqin, issued in Application Of Electronic Technique, dated Jul. 31, 2018.

* cited by examiner

*Primary Examiner* — Yemane Mehari
(74) *Attorney, Agent, or Firm* — Zhu Lehnhoff LLP

(57) ABSTRACT

In a synchronous rectification switching power supply circuit and a control method for a primary switching transistor and an electronic device, one end of a first switching transistor is coupled to a transformer, and the other end thereof is grounded; a second end and a third end of the transformer are respectively coupled to a first end of the first capacitor and a first end of the second switching transistor; a second end of a second switching transistor is coupled to a second end of a first capacitor; a first resistor is connected in parallel with the first capacitor; and a monitoring circuit is coupled to the switching transistor control unit in such a manner that the operating condition of the secondary side output rectification circuit is monitored in real-time by the monitoring circuit.

20 Claims, 10 Drawing Sheets

SYNCHRONOUS RECTIFICATION SWITCHING POWER SUPPLY CIRCUIT AND PRIMARY SWITCH TUBE CONTROL METHOD

REFERENCE TO RELATED APPLICATIONS

This application claims the benefit of priority to China Patent Application No. 202310709462.X, filed on Jun. 14, 2023, which is incorporated herein by reference in its entirety.

TECHNICAL FIELD

The present invention relates to the field of power supply, in particular to a synchronous rectification switching power supply circuit, a control method of a primary switching transistor, and an electronic device.

BACKGROUND ART

In recent years, synchronous rectification technology has been widely used in the field of switching power supply topology, especially in the field of communication power supply and switching power supply.

In the current synchronous rectification technology, the low closure resistance switching transistor is generally used to replace the diode to achieve rectification of the circuit, reducing the circuit closure loss and improving the circuit efficiency. However, its reliability is far inferior to that of diode rectification technology, and improper design can easily lead to the "simultaneous conduction" of both the primary and secondary circuits, resulting in break down.

In order to avoid the simultaneous conduction of both the primary and secondary circuits, existing solutions focus on synchronous rectification control techniques, such as slope detection, integration, etc. to distinguish between normal primary PWM switching waveforms and transformer excitation waveforms. However, simultaneous conduction can still be prone to occur under extremely large dynamic loads and rapid input voltage switching. Moreover, the anti-simultaneous conduction method done on the synchronous rectifier controller can only be regarded as a preventive measure in a special case, i.e., its preventive measures are based on certain assumptions. Once the assumptions do not hold, the preventive measures will easily fail, and the primary switching transistor will be turned on during the "on" period of the secondary synchronous rectifier tube, which leads to the occurrence of the simultaneous conduction of both the primary and the secondary side circuits.

Thus, how to avoid the conduction of the primary switching transistor during the "on" period of the secondary synchronous rectifier, in order to avoid the problem of simultaneous conduction of the primary and the secondary side circuits, has become the industry's current urgent need to solve the technical problem.

SUMMARY OF THE INVENTION

The present invention provides a synchronous rectification switching power supply circuit, a control method of a primary switching transistor, and an electronic device to solve the problem of the conduction of the primary switching transistor during the "on" period of the secondary synchronous rectifier.

According to a first aspect of the present invention, provided is a synchronous rectification switching power supply circuit which, when operating in a discontinuous mode, includes: a primary side input circuit, a transformer, a secondary side output rectification circuit, and a monitoring circuit; wherein the primary side input circuit includes a switching transistor control unit and a first switching transistor, and the secondary side output rectification circuit includes a second switching transistor, a first capacitor, and a first resistor;

an output end of the switching transistor control unit is coupled to a control end of the first switching transistor; a first end of the first switching transistor is coupled to a first end of the transformer; a second end of the first switching transistor is grounded; a second end of the transformer is coupled to a first end of the first capacitor; a third end of the transformer is coupled to a first end of the second switching transistor; a second end of the second switching transistor is coupled to a second end of the first capacitor; a control end of the second switching transistor receives a second drive voltage; the first resistor is connected in parallel with the first capacitor; the monitoring circuit is coupled to a first input end of the switching transistor control unit; wherein:

the monitoring circuit is configured to: monitor an operating condition of the secondary side output rectification circuit in real-time, and send the monitored operating condition of the secondary side output rectification circuit to the switching transistor control unit; wherein the operating condition includes at least an on state of the second switching transistor and an off state of the second switching transistor;

the switching transistor control unit is configured to:

if the operating condition of the secondary side output rectification circuit is the off state of the second switching transistor, control the first switching transistor to be on; and if the operating condition of the secondary side output rectification circuit is the on state of the second switching transistor, control the first switching transistor to be off.

Optionally, the transformer includes a primary winding and a first secondary winding;

a first output end of the primary winding is coupled to the first end of the first switching transistor, an output end of the primary winding is coupled to an input end of the first secondary winding, and a first output end and a second output end of the first secondary winding are respectively coupled to the first end of the first capacitor and the first end of the second switching transistor.

Optionally, the monitoring circuit includes an auxiliary winding, a first diode, a second capacitor, a second resistor, a first voltage dividing resistor, and a second voltage dividing resistor; wherein:

a first end of the auxiliary winding is coupled to the output end of the primary winding; an anode of the first diode and a first end of the first voltage dividing resistor are coupled to a first output end of the auxiliary winding; a cathode of the first diode is respectively coupled to a first end of the second capacitor; the second capacitor is connected in parallel with the second resistor; a second end of the second capacitor is grounded; a second end of the first voltage dividing resistor is respectively coupled to a first end of the second voltage dividing resistor and the first input end of the switching transistor control unit; a second end of the second voltage dividing resistor is coupled to a second output end of the auxiliary winding; and a second end of the second voltage dividing resistor is grounded;

wherein the operating condition of the secondary side output rectification circuit is characterized by the voltage value and/or current value of the second end of the first voltage dividing resistor.

Optionally, the operating condition of the secondary side output rectification circuit is characterized by the voltage value and/or current value of the second end of the first voltage dividing resistor, specifically:

if the voltage value and/or current value of the second end of the first voltage dividing resistor is within a corresponding pre-set voltage value range and/or pre-set current value range, it is characterized that the operating condition of the secondary side output rectification circuit is the off state of the second switching transistor; and if the voltage value and/or current value of the second end of the first voltage dividing resistor is not within the corresponding range of the pre-set voltage value and/or the pre-set current value, it is characterized that the operating condition of the secondary side output rectification circuit is the on state of the second switching transistor.

Optionally, the primary side input circuit is a flyback conversion circuit; the primary side input circuit further includes a third resistor; and a first end of the third resistor is coupled to the second end of the first switching transistor, and a second end of the third resistor is grounded.

Optionally, the flyback conversion circuit is an AHB flyback conversion circuit; the primary side input circuit further includes a third switching transistor; and a control end of the third switching transistor is coupled to a second output end of the switching transistor control unit, a first end of the third switching transistor and a first end of the first switching transistor are respectively coupled to the first output end of the primary winding, and a second end thereof is grounded via a power supply side capacitor.

Optionally, the operating condition of the secondary side output rectification circuit is characterized by the voltage value and/or current value of the second end of the first voltage dividing resistor, specifically:

if the voltage value and/or current value of the second end of the first voltage dividing resistor is less than or equal to a first pre-set voltage value and/or first pre-set current value, it is characterized that the operating condition of the secondary side output rectification circuit is the off state of the second switching transistor; and if the voltage value of the second end of the first voltage dividing resistor is greater than the first pre-set voltage value and/or the first pre-set current value, it is characterized that the operating condition of the secondary side output rectification circuit is the on state of the second switching transistor.

Optionally, the primary side input circuit is an LLC resonance conversion circuit; and the primary side input circuit further includes the third switching transistor;

the control end of the third switching transistor is coupled to the second output end of the switching transistor control unit, the first end of the third switching transistor and the first end of the first switching transistor are respectively coupled to a second output end of the primary winding, and the second end thereof is grounded via the power supply side capacitor.

Optionally, the transformer further includes a second secondary winding, and the secondary side output rectification circuit further includes a third capacitor, and a fourth switching transistor;

a first end of the third capacitor is respectively coupled to a first output end of a second secondary winding and the first end of the first capacitor; a first end of the fourth switching transistor is coupled to the second output end of the second secondary winding; a second end thereof is respectively coupled to a second end of the third capacitor and the second end of the first resistor, and a control end thereof receives a fourth drive voltage.

Optionally, the operating condition further includes an on state of the fourth switching transistor and an off state of the fourth switching transistor; the operating condition of the secondary side output rectification circuit is characterized by the voltage value and/or current value of the second end of the first voltage dividing resistor, specifically:

if the voltage value and/or current value of the second end of the first voltage dividing resistor is less than or equal to the first pre-set voltage value and/or the first pre-set current value, it is characterized that the operating condition of the secondary side output rectification circuit is the off state of the fourth switching transistor;

if the voltage value and/or current value of the second end of the first voltage dividing resistor is greater than the first pre-set voltage value and/or the first pre-set current value, it is characterized that the operating condition of the secondary side output rectification circuit is the on state of the fourth switching transistor;

the voltage value and/or current value of the second end of the first voltage dividing resistor is greater than or equal to a second pre-set voltage value and/or the first pre-set current value, it is characterized that the operating condition of the secondary side output rectification circuit is the off state of the second switching transistor; and the voltage value and/or current value of the second end of the first voltage dividing resistor is less than the corresponding the first pre-set voltage value and/or the first pre-set current value, it is characterized that the operating condition of the secondary side output rectification circuit is the on state of the second switching transistor.

Optionally, the operating condition further includes a pre-on state of the second switching transistor.

Optionally, the switching transistor control unit is further configured to:

if the operating condition of the secondary side output rectification circuit is the pre-on state of the second switching transistor, control the first switching transistor to be off.

the operating condition of the secondary side output rectification circuit is characterized by a rising slope or a falling slope of the voltage and/or a rising slope or a falling slope of the current at the second end of the first voltage dividing resistor, specifically:

if the rising slope of the voltage at the second end of the first voltage dividing resistor is greater than or equal to a first pre-set slope, or the falling slope is greater than or equal to a second pre-set slope, and/or the rising slope of the current is greater than or equal to a third pre-set slope, or the falling slope is greater than or equal to a fourth pre-set slope, it is characterized that the operating condition of the secondary side output rectification circuit is the pre-on state of the second switching transistor.

Optionally, further included is a feedback module; wherein the feedback module includes a first feedback unit and a second feedback unit;

the first feedback unit is connected in parallel with the first resistor, a first end of the second feedback unit is coupled to a second input end of the switching transistor control unit, and a second end thereof is grounded;

wherein the first feedback unit is configured to transmit a feedback voltage sample to the second feedback unit, and the second feedback unit is configured to transmit the feedback voltage to the switching transistor control unit, wherein the voltage value of the feedback voltage is equal to the voltage value of the voltage output by the secondary side output rectification circuit.

Optionally, the switching transistor control unit is further configured to:

in the case where the voltage value of the feedback voltage received by the switching transistor control unit is greater than or equal to a Burst mode exit voltage:

if the operating condition of the secondary side output rectification circuit is the off state of the second switching transistor, control the first switching transistor to be on;

if the operating condition of the secondary side output rectification circuit is the on state of the second switching transistor, enter a tolerance state, and detect the operating condition of the secondary side output rectification circuit in real-time within a tolerance time; and if the operating condition of the secondary side output rectification circuit detected within the tolerance time changes to the off state of the second switching transistor, control the first switching transistor to be on; and if the operating conditions of the secondary side output rectification circuit detected within the tolerance time are all the on states of the second switching transistor, enter a forced-on state at the end of the tolerance time, and control the first switching transistor to be on.

According to a second aspect of the present invention, provided is a method of controlling a primary switching transistor for controlling a synchronous rectification switching power supply circuit as provided in any of the second aspects of the present invention, the method including:

monitoring an operating condition of the secondary side output rectification circuit in real-time, and sending the monitored operating condition of the secondary side output rectification circuit to the switching transistor control unit; wherein the operating condition includes at least an on state of the second switching transistor and an off state of the second switching transistor;

if the operating condition of the secondary side output rectification circuit is the off state of the second switching transistor, controlling the first switching transistor to be on; and if the operating condition of the secondary side output rectification circuit is the on state of the second switching transistor, controlling the first switching transistor is to be off.

According to a third aspect of the present invention, provided is an electronic device including a synchronous rectification switching power supply circuit as provided in any of the first aspects of the present invention.

The present invention provides a synchronous rectification switching power supply circuit, a control method for a primary switching transistor and an electronic device. One end of a first switching transistor is coupled to a transformer, and the other end thereof is grounded. A second end and a third end of the transformer are respectively coupled to a first end of the first capacitor and a first end of the second switching transistor. A second end of a second switching transistor is coupled to a second end of a first capacitor. A first resistor is connected in parallel with the first capacitor. A monitoring circuit is coupled to the switching transistor control unit in such a manner that the operating condition of the secondary side output rectification circuit is monitored in real-time by the monitoring circuit. When the operating condition of the secondary side output rectification circuit is an off state of the second switching transistor, the switching transistor control unit controls the switch to be on, and when the operating condition of the secondary side output rectification circuit is an on state of the second switching transistor, the switching transistor control unit controls the switch to be off. Thus, it is possible to avoid the conduction of the primary switching transistor during the "on" period of the secondary synchronous rectifier and to avoid the problem of simultaneous conduction of both the primary and secondary circuits.

BRIEF DESCRIPTION OF THE DRAWINGS

In order to more clearly illustrate the technical solutions of the embodiments of the present invention or the prior art, a brief description will be given below of the embodiments or the accompanying drawings that are required to be used in the description of the prior art. It is obvious that the drawings in the description below are only some embodiments described in the present invention, and it would be obvious for a person skilled in the art to obtain other drawings according to these drawings without involving any inventive effort.

REFERENCE SIGNS

1—Primary side input circuit;
2—Transformer;
3—Secondary side output rectification circuit;
4—Monitoring circuit;
5—RCD snubber circuit; and
Cin—Power side capacitance.

DETAILED DESCRIPTION OF THE INVENTION

The technical solutions in the embodiments of the present invention will be described clearly and completely in conjunction with the accompanying drawings in the embodiments of the present invention. Obviously, the described embodiments are only a part of the embodiments of the present invention, rather than all the embodiments. Based on the embodiments of the present invention, all other embodiments obtained by a person of ordinary skill in the art without inventive effort fall within the scope of the present invention.

The terms "first", "second", "third", "fourth" and the like if present in the description, claims, and the aforementioned figures, are used for distinguishing between similar objects and not necessarily for describing a particular sequential or chronological order. It is to be understood that the data used in this way are interchangeable under appropriate circumstances such that the embodiments of the present invention described herein are capable of operation in sequences other than those illustrated or otherwise described herein. Furthermore, the terms "include" and "have", as well as any variations thereof, are intended to cover a non-exclusive inclusion, such that a process, method, system, product, or device that includes a list of steps or elements is not necessarily limited to those steps or elements expressly listed, but may include other steps or elements not expressly listed or inherent to such process, method, product, or device.

The following provides a detailed explanation of the technical solution of the present invention with specific implementation examples. The following specific embodiments may be combined with one another, and the same or similar concepts or processes may not be repeated in some embodiments.

Figure 1:
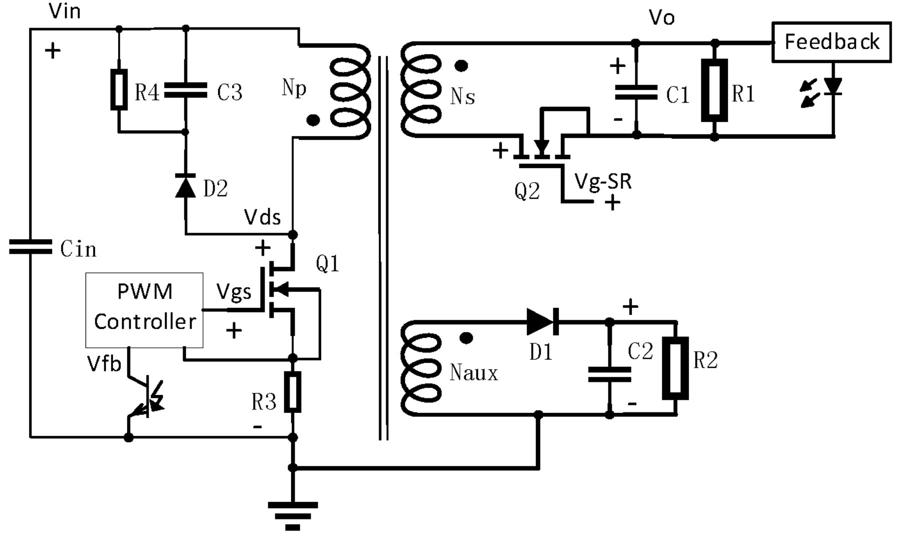
FIG. 1 is a schematic diagram of a configuration of a flyback conversion circuit with synchronous rectification in prior art.

Prior to the filing of the present application, the applicant fully studied the conversion circuit. Based on the research, proposed is a flyback conversion circuit with synchronous rectification as shown in FIG. 1, including a primary side input circuit, a transformer, a secondary side output rectification circuit, an auxiliary winding power supply circuit, an RCD snubber circuit, and a power supply side capacitor. The primary side input circuit includes a switching transistor control unit (PWM Controller), a first switching transistor Q1, and a third resistor R3. The transformer includes a primary winding, a secondary winding and an auxiliary winding. The secondary side output rectification circuit includes a second switching transistor Q2, a first capacitor C1 and a first resistor R1. The auxiliary winding power supply circuit includes a first diode D1, a second capacitor C2, and a second resistor R2. The RCD snubber circuit includes a fourth resistor D4, a third capacitor C3, and a second diode D2. The transformer includes a primary winding Np, a secondary winding Ns, and an auxiliary winding Naux.

An output end of the switching transistor control unit PWM Controller is connected to a control end of the first switching transistor Q1. A first end of the first switching transistor Q1 is connected to a first output end of the primary winding Np. A second end of the first switching transistor Q1 is connected to a first end of the third resistor R3. A second end of the third resistor R3 is grounded. A first end of the secondary winding Ns is coupled to a first end of the first capacitor C1. A second end of the secondary winding Ns is coupled to a first end of the second switching transistor Q2. A second end of the second switching transistor Q2 is coupled to a second end of the first capacitor C1. A control end of the second switching transistor Q2 receives a second drive voltage Vg-SR. The first resistor R1 is connected in parallel with the first capacitor C1. A first end of the auxiliary winding Naux is connected to an anode of the first diode D1. A cathode of the first diode D1 is connected to a first end of the second capacitor C2. A second end of the auxiliary winding Naux is connected to a second end of the second capacitor C2. The second resistor R2 is connected in parallel to the second capacitor C2. A second end of the second capacitor C2 is grounded.

In the above solutions, there is a problem that it is difficult to avoid the conduction of the primary switching transistor during the "on" period of the secondary synchronous rectifier tube, specifically:

when the flyback conversion circuit with synchronous rectification is in a DCM mode, the switching transistor control unit will seek the valley bottom to be conducted. If the DCM frequency is too low, the excitation inductance and parasitic capacitance oscillation energy in the circuit will be attenuated to a very low level, resulting in the possibility that the switching transistor control unit may not be able to find the valley signal. In order to prevent the switching transistor control unit from not driving because it is waiting for a valley signal that will not be present, a minimum operating frequency or a maximum turn-off time is introduced. When the clock of the minimum operating frequency or the maximum turn-off time reaches, even if there is no valley bottom signal, the primary switching transistor will be turned on. However, if the minimum operating frequency clock or the maximum turn-off time occurs during the conduction period of the secondary switching transistor SR MOS, it will lead to the phenomenon of simultaneous conduction of both the primary and secondary sides.

When the flyback conversion circuit with synchronous rectification is in the Burst mode, the switching transistor control unit will exit the Burst mode if it detects that the output voltage of the secondary side output rectification circuit fed back from the secondary side is greater than or equal to the pre-set voltage set by the switching transistor control unit, and then the switching transistor control unit will immediately turn on the primary switching transistor, and if the SR MOS of the secondary switching transistor is in the conduction state at this time, it will lead to the phenomenon of simultaneous conduction of both the primary and secondary sides.

Figure 2:
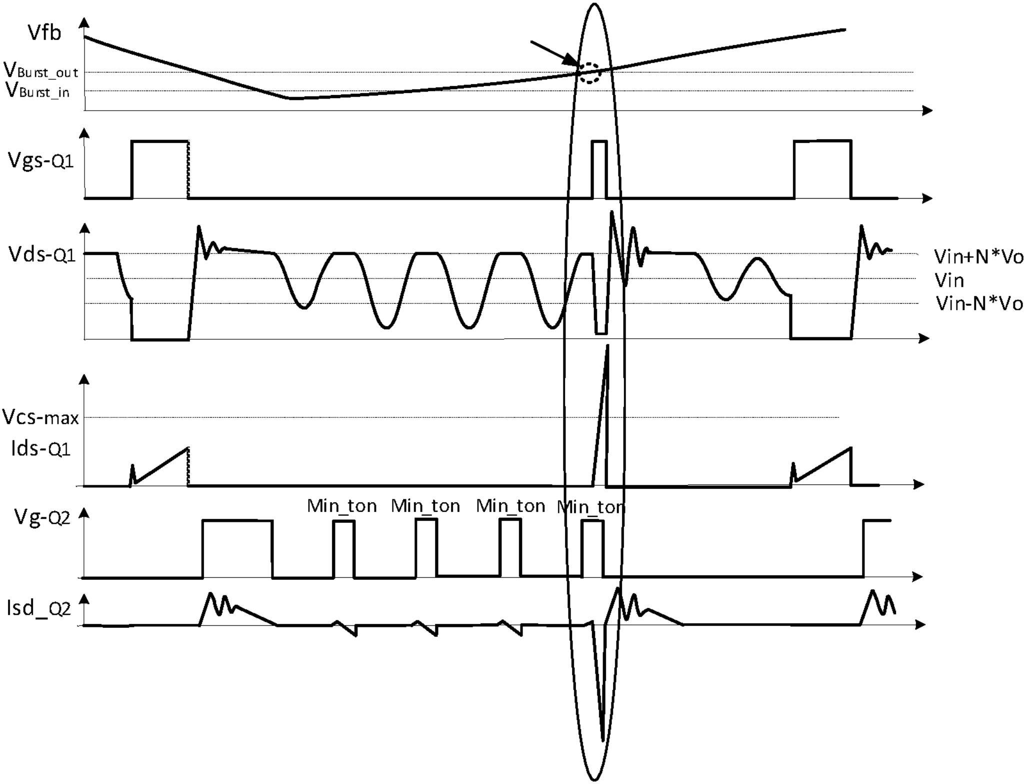
FIG. 2 is a waveform diagram of the flyback conversion circuit with synchronous rectification shown in FIG. 1.

Specifically, please refer to FIG. 2. FIG. 2 is a key waveform diagram of a flyback conversion circuit with synchronous rectification in the Burst mode in the prior art. It can be seen from the figure that when the switching transistor control unit detects that the feedback voltage Vfb fed back by the secondary side is greater than or equal to the pre-set voltage Vburst_out set thereby, if the switching transistor control unit immediately controls the primary switching transistor to be on, it will lead to the phenomenon of simultaneous conduction of both the primary and secondary sides, thus resulting in break down.

In order to solve the above-mentioned problems, the solutions adopted in the prior art all focus on synchronous rectification control techniques, such as slope detection, integration, etc. to distinguish between normal primary PWM switching waveforms and transformer excitation waveforms. However, simultaneous conduction can still be prone to occur under extremely large dynamic loads and rapid input voltage switching. Moreover, the anti-simultaneous conduction method done on the synchronous rectifier controller can only be regarded as a preventive measure in a special case, i.e., its preventive measures are based on certain assumptions. Once the assumptions do not hold, the preventive measures will easily fail, and the primary switching transistor will be turned on during the "on" period of the secondary synchronous rectifier tube, which leads to the occurrence of the phenomenon of simultaneous conduction of both the primary and the secondary circuits.

In view of the above, the present invention provides a synchronous rectification switching power supply circuit, a control method for a primary switching transistor and an electronic device. One end of a first switching transistor is coupled to a transformer, and the other end thereof is grounded. A second end and a third end of the transformer are respectively coupled to a first end of the first capacitor and a first end of the second switching transistor. A second end of a second switching transistor is coupled to a second end of a first capacitor. A first resistor is connected in parallel with the first capacitor. A monitoring circuit is coupled to the switching transistor control unit in such a manner that the operating condition of the secondary side output rectification circuit is monitored in real-time by the monitoring circuit. When the operating condition of the secondary side output rectification circuit is an off state of the second switching transistor, the switching transistor control unit controls the switch to be on, and when the operating condition of the secondary side output rectification circuit is the on state of the second switching transistor, the switching transistor control unit controls the switch to be off. Thus, it is possible to avoid the conduction of the primary switching transistor during the "on" period of the secondary synchronous rectifier and to avoid the problem of simultaneous conduction of both the primary and secondary circuits.

Figure 3:
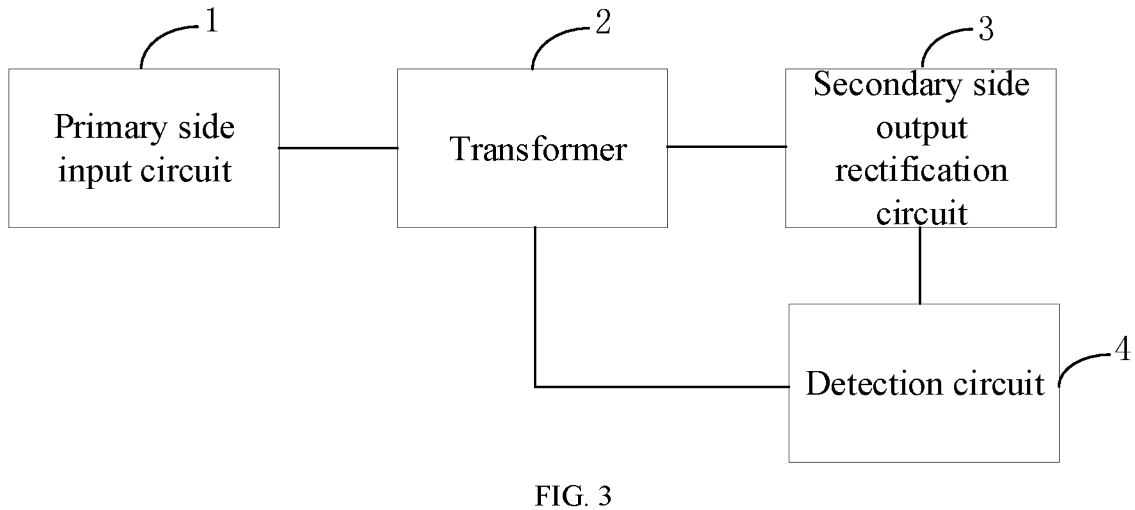
FIG. 3 is a schematic diagram of a configuration of a synchronous rectification switching power supply circuit according to an embodiment of the present invention.
Figure 4:
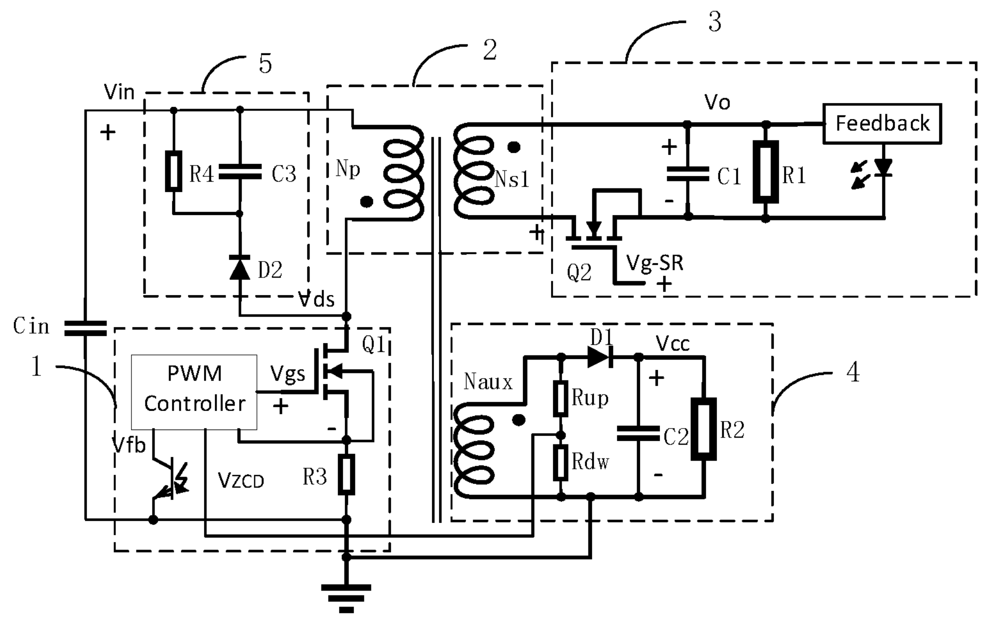
FIG. 4 is a schematic diagram of a configuration of a synchronous rectification switching power supply circuit according to a first embodiment of the present invention.

The solution of the present invention is described in detail as follows:

With reference to FIGS. 3 and 4, an embodiment of the present invention provides a synchronous rectification switching power supply circuit which, when operating in a discontinuous mode, includes: a primary side input circuit 1, a transformer 2, a secondary side output rectification circuit 3, and a monitoring circuit 4. The primary side input circuit 1 includes a switching transistor control unit PWM Controller and a first switching transistor Q1, and the secondary side output rectification circuit 3 includes a second switching transistor Q2, a first capacitor C1, and a first resistor R1.

An output end of the switching transistor control unit PWM Controller is coupled to a control end of the first switching transistor Q1. A first end of the first switching transistor Q1 is coupled to a first end of the transformer 2. A second end of the first switching transistor Q1 is grounded. A second end of the transformer 2 is coupled to a first end of the first capacitor C1. A third end of the transformer 2 is coupled to a first end of the second switching transistor Q2. A second end of the second switching transistor Q2 is coupled to a second end of the first capacitor C1. A control end of the second switching transistor Q2 receives a second drive voltage Vg-SR. The first resistor R1 is connected in parallel with the first capacitor C1. The monitoring circuit 4 is coupled to a first input end of a switching transistor control unit PWM Controller.

The monitoring circuit 4 is configured to monitor an operating condition of the secondary side output rectification circuit 3 in real-time, and send the monitored operating condition of the secondary side output rectification circuit 3 to the switching transistor control unit PWM Controller. The operating condition includes at least an on state of the second switching transistor Q2 and an off state of the second switching transistor Q2.

The switching transistor control unit PWM Controller is configured to:

- if the operating condition of the secondary side output rectification circuit 3 is the off state of the second switching transistor Q2, control the first switching transistor Q1 to be on; and
- if the operating condition of the secondary side output rectification circuit 3 is the on state of the second switching transistor Q2, control the first switching transistor Q1 to be off.

It should be understood that the circuit operating in the discontinuous mode may be a synchronous rectification switching power supply circuit having only a discontinuous mode, and may be a synchronous rectification switching power supply circuit having both a discontinuous mode and a continuous mode. The circuit provided by the present invention may also be applied to a synchronous rectification switching power supply circuit having both a discontinuous mode and a continuous mode when operating in the discontinuous mode state.

With regard to the transformer 2, in a preferred embodiment, please continue to refer to FIG. 4. The transformer 2 includes a primary winding Np and a first secondary winding Ns1;

A first output end of the primary winding Np is coupled to a first end of the first switching transistor Q1. An output end of the primary winding Np is coupled to an input end of the first secondary winding Ns1. A first output end and a second output end of the first secondary winding Ns1 are coupled to a first end of the first capacitor C1 and a first end of the second switching transistor Q2, respectively.

In an embodiment, the monitoring circuit 4 is coupled to the secondary side output rectification circuit 3 to monitor the operating condition of the secondary side output rectification circuit 3 in real-time;

In a specific embodiment, the operating condition of the secondary side output rectification circuit 3 can be monitored in real-time by inducing the voltage of the secondary winding. In an example, please refer to FIG. 4, the monitoring circuit 4 includes an auxiliary winding Naux, a first diode D1, a second capacitor C2, a second resistor R2, a first voltage dividing resistor Rup, and a second voltage dividing resistor Rdw.

A first end of the auxiliary winding Naux is coupled to the output end of the primary winding Np. An anode of the first diode D1 and a first end of the first voltage dividing resistor Rup are coupled to a first output end of the auxiliary winding Naux. A cathode of the first diode D1 is respectively coupled to a first end of the second capacitor C2. The second capacitor C2 is connected in parallel with the second resistor R2. A second end of the second capacitor C2 is grounded. A second end of the first voltage dividing resistor Rup is respectively coupled to a first end of the second voltage dividing resistor Rdw and the first input end of the switching transistor control unit PWM Controller. A second end of the second voltage dividing resistor is coupled to a second output end of the auxiliary winding Naux. A second end of the second voltage dividing resistor Rdw is grounded.

The operating condition of the secondary side output rectification circuit 3 is characterized by the voltage value and/or current value of the second end of the first voltage dividing resistor Rup.

In this case, the operating condition of the secondary side output rectification circuit 3 is characterized by the voltage value and/or current value of the second end of the first voltage dividing resistor Rup, specifically:

- if the voltage value and/or current value of the second end of the first voltage dividing resistor Rup is within a corresponding pre-set voltage value range and/or pre-set current value range, it is characterized that the operating condition of the secondary side output rectification circuit 3 is the off state of the second switching transistor Q2; and
- if the voltage value and/or current value of the second end of the first voltage dividing resistor Rup is not within the corresponding range of the pre-set voltage value and/or the pre-set current value, it is characterized that the operating condition of the secondary side output rectification circuit 3 is the on state of the second switching transistor Q2.

It should be understood that the turns ratio of the primary winding Np to the first secondary winding Ns1 and the turns ratio of the first secondary winding Ns1 to the auxiliary winding Naux may be determined according to the actual needs of the circuit, and the present invention is not limited thereto.

In actual use of the monitoring circuit 4, in an embodiment, referring to FIG. 4, the primary side input circuit 1 is a flyback conversion circuit and the primary side input circuit 1 further includes a third resistor R3.

- a first end of the third resistor R3 is coupled to the second end of the first switching transistor Q1 and a second end of the third resistor R3 is grounded.

In this case, the operating condition of the secondary side output rectification circuit 3 is characterized by the voltage value and/or current value of the second end of the first voltage dividing resistor Rup, specifically:

- if the voltage value and/or current value of the second end of the first voltage dividing resistor Rup is less than or equal to a first pre-set voltage value and/or first pre-set current value, it is characterized that the operating condition of the secondary side output rectification circuit 3 is the off state of the second switching transistor Q2; and
- if the voltage value of the second end of the first voltage dividing resistor Rup is greater than the first pre-set voltage value and/or the first pre-set current value, it is characterized that the operating condition of the secondary side output rectification circuit 3 is the on state of the second switching transistor Q2.

In the example shown in FIG. 4, the synchronous rectification switching power supply circuit further includes an RCD snubber circuit 5. The first output end of the primary winding Np is coupled to a first end of the RCD snubber circuit 5, a second end of the RCD snubber circuit 5 is coupled to the first end of the first switching transistor Q1, and a third end thereof is grounded via a power supply side capacitor Cin.

In an example, with continued reference to FIG. 4, the RCD snubber circuit 5 includes a fourth resistor R4, a third capacitor C3, and a second diode D2.

A first output end of the primary winding Np is respectively coupled to a first end of the third capacitor C3 and a first end of the fourth resistor R4. A second end of the third capacitor C3 is respectively coupled to a second end of the fourth resistor R4 and the cathode of the second diode D2. The anode of the second diode D2 is coupled to a second output end of the primary winding Np.

In practical use, in order to further control the turn-off timing of the first switching transistor Q1, in an embodiment, referring to FIG. 4, a third input end of the switching transistor control unit PWM Controller is also coupled to the first end of the third resistor R3. The switching transistor control unit PWM Controller controls a turn-off timing of the first switching transistor Q1 by monitoring the current flowing through the third resistor R3.

Figure 5:
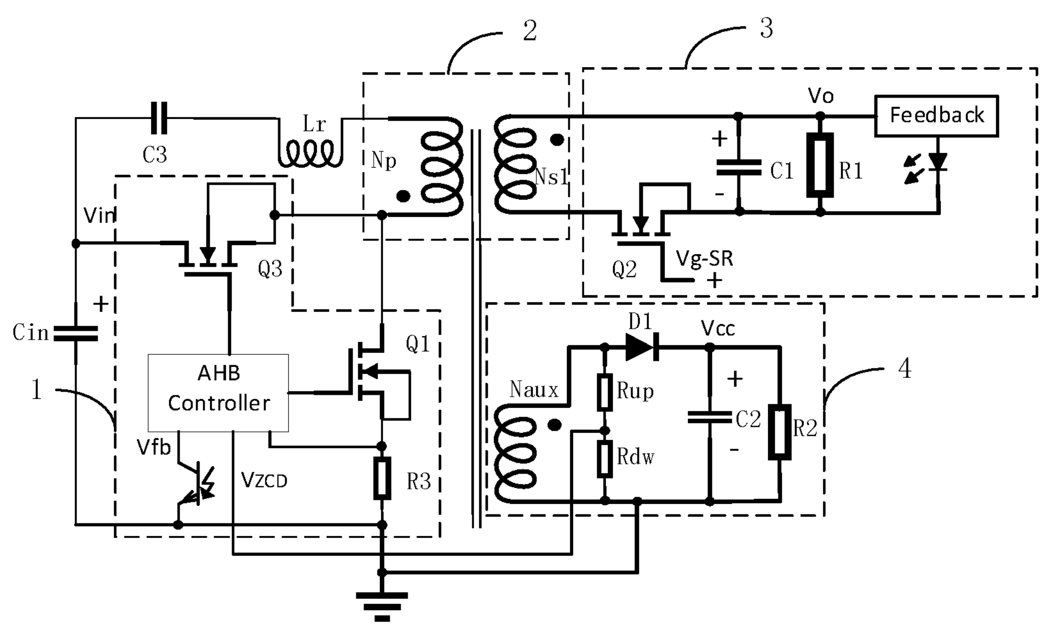
FIG. 5 is a schematic diagram of a configuration of a synchronous rectification switching power supply circuit according to a second embodiment of the present invention.

In another specific embodiment, referring to FIG. 5, the flyback conversion circuit is an AHB conversion circuit with synchronous rectification. In this case, the primary side input circuit 1 further includes a third switching transistor Q3.

A control end of the third switching transistor Q3 is coupled to a second output end of the switching transistor control unit AHB Controller. A first end of the third switching transistor Q3 and a first end of the first switching transistor Q1 are respectively coupled to a first output end of the primary winding Np. A second end thereof is grounded via a power supply side capacitor Cin.

In the example shown in FIG. 5, the AHB conversion circuit with synchronous rectification further includes a third capacitor C3 and an inductor Lr. The first output end of the primary winding Np is coupled to a first end of the inductor Lr. A second end of the inductor Lr is coupled to a first end of the third capacitor C3. The second end of the third capacitor C3 is grounded through the power supply side capacitor Cin.

Figure 6:
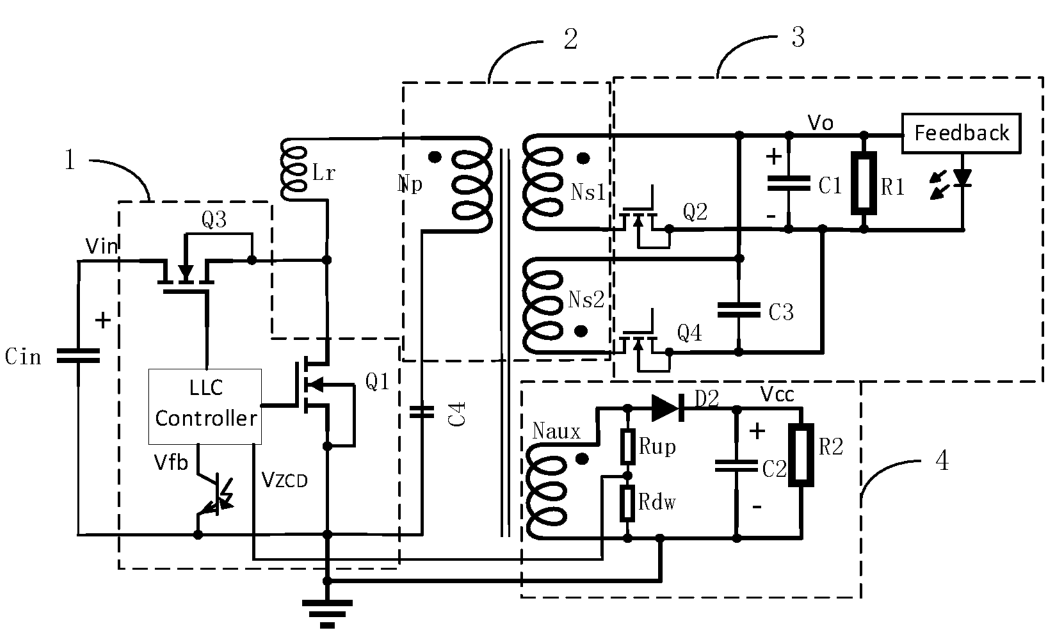
FIG. 6 is a schematic diagram of a configuration of a synchronous rectification switching power supply circuit according to a third embodiment of the present invention.

In another embodiment, referring to FIG. 6, the primary side input circuit 1 is an LLC resonance conversion circuit. The primary side input circuit 1 further includes a third switching transistor Q3.

A control end of the third switching transistor Q3 is coupled to a second output end of the switching transistor control unit LLC Controller. A first end of the third switching transistor Q3 and a first end of the first switching transistor Q1 are respectively coupled to a second output end of the primary winding Np, and a second end thereof is grounded via a power supply side capacitor Cin.

In this case, the transformer 2 further includes a second secondary winding Ns2. The secondary side output rectification circuit 3 further includes a third capacitor C3 and a fourth switching transistor Q4.

A first end of the third capacitor C3 is respectively coupled to a first output end of a second secondary winding Ns2 and a first end of the first capacitor C1. A first end of the fourth switching transistor Q4 is coupled to a second output end of the second secondary winding Ns2. A second end thereof is respectively coupled to a second end of the third capacitor C3 and a second end of the first resistor R1. A control end thereof receives a fourth drive voltage (not shown in FIG. 6).

In this case, the operating condition further includes an on state of the fourth switching transistor Q4 and an off state of the fourth switching transistor Q4. The operating condition of the secondary side output rectification circuit 3 is characterized by the voltage value and/or current value of the second end of the first voltage dividing resistor Rup, specifically:

- if the voltage value and/or current value of the second end of the first voltage dividing resistor Rup is less than or equal to the first pre-set voltage value and/or the first pre-set current value, it is characterized that the operating condition of the secondary side output rectification circuit 3 is the off state of the fourth switching transistor Q4;
- if the voltage value and/or current value of the second end of the first voltage dividing resistor Rup is greater than the first pre-set voltage value and/or the first pre-set current value, it is characterized that the operating condition of the secondary side output rectification circuit 3 is the on state of the fourth switching transistor Q4;
- if the voltage value and/or current value of the second end of the first voltage dividing resistor Rup is greater than or equal to a second pre-set voltage value and/or the first pre-set current value, it is characterized that the operating condition of the secondary side output rectification circuit 3 is the off state of the second switching transistor Q2; and
- if the voltage value and/or current value of the second end of the first voltage dividing resistor Rup is less than the corresponding the first pre-set voltage value and/or the first pre-set current value, it is characterized that the operating condition of the secondary side output rectification circuit 3 is the on state of the second switching transistor Q2.

In the example shown in FIG. 6, the LLC resonance conversion circuit further includes the inductance Lr and a fourth capacitance C4.

The first end of the third switching transistor Q3 and the first end of the first switching transistor Q1 are both coupled to the second output end of the primary winding Np via the inductor Lr. The first output end of the primary winding Np is grounded via the fourth capacitor C4.

In a preferred embodiment, it is also necessary to forbid the first switching transistor Q1 from conducting when the second switching transistor Q2 is about to satisfy a conduction condition, so as to avoid the phenomenon of simultaneous conduction of both the primary and the secondary side circuits due to an error in practical use. In a specific embodiment, the operating condition further includes a pre-on state of the second switching transistor Q2.

In this case, the switching transistor control unit PWM Controller is further configured to:

- if the operating condition of the secondary side output rectification circuit 3 is the pre-on state of the second switching transistor Q2, control the first switching transistor Q1 to be off.

In an example, the monitoring circuit 4 shown in FIG. 4 is configured to detect the operating condition of the secondary side output rectification circuit 3. The operating condition of the secondary side output rectification circuit 3 is characterized by a rising slope or a falling slope of the voltage and/or a rising slope or a falling slope of the current at the second end of the first voltage dividing resistor Rup, specifically:

- if the rising slope of the voltage at the second end of the first voltage dividing resistor Rup is greater than or equal to a first pre-set slope, or the falling slope is greater than or equal to a second pre-set slope, and/or the rising slope of the current is greater than or equal to a third pre-set slope, or the falling slope is greater than or equal to a fourth pre-set slope, it is characterized that the operating condition of the secondary side output rectification circuit 3 is the pre-on state of the second switching transistor Q2.

Of course, the present invention does not limit the specific implementation form of the monitoring circuit 4 used. In an example, a high-speed optical coupling or magnetic coupling (namely, a transformer) technology can be used to transmit the "on" signal of the second switching transistor Q2 to the switching transistor control unit. In other examples, it is also possible to provide a current sensing module and the like in the secondary side output rectification circuit 3. The present invention also does not limit the specific type of the primary side input circuit 1 and the specific composition form of each circuit module, which can be adaptively adjusted according to actual needs. However, the present invention is not limited thereto, as long as the technical concept of the present invention is used, so that the switching transistor control unit can control the first switching transistor Q1 to be on/off according to the operating condition of the secondary side output rectification circuit 3, thus avoiding the conduction of the primary switching transistor during the "on" period of the secondary synchronous rectifier tube, all of which are within the scope of the present invention.

Specific application scenarios for the synchronous rectification switching power supply circuit of the present invention are described below.

In an embodiment, the switching transistor control unit PWM Controller may be caused to control the first switching transistor Q1 to be on/off depending on the operating condition of the secondary side output rectification circuit 3 when the first switching transistor Q1 satisfies an on condition.

In one example, referring to FIGS. 4 to 6, in the case where the synchronous rectification switching power supply circuit provided by the embodiment of the present invention is in the Burst mode,

- if the voltage value of the feedback voltage Vfb received by the switching transistor control unit is greater than or equal to a Burst mode exit voltage, it is characterized that the synchronous rectification switching power supply circuit exits the Burst mode; and
- if the voltage value of the feedback voltage Vfb received by the switching transistor control unit is less than a Burst mode entry voltage, it is characterized that the synchronous rectification switching power supply circuit enters the Burst mode.

In this case, the switching transistor control unit PWM Controller is further configured to:

- in the case where the voltage value of the feedback voltage Vfb received by the switching transistor control unit is greater than or equal to a Burst mode exit voltage:
- if the operating condition of the secondary side output rectification circuit 3 is the off state of the second switching transistor Q2, control the first switching transistor Q1 to be on;
- if the operating condition of the secondary side output rectification circuit 3 is the on state of the second switching transistor Q2, enter a tolerance state, and detect the operating condition of the secondary side output rectification circuit 3 in real-time within a tolerance time; and if the operating condition of the secondary side output rectification circuit 3 detected within the tolerance time changes to the off state of the second switching transistor Q2, control the first switching transistor Q1 to be on; and if the operating conditions of the secondary side output rectification circuit 3 detected within the tolerance time are all the on states of the second switching transistor Q2, enter a forced-on state at the end of the tolerance time, and control the first switching transistor Q1 to be on.

In order to feed back the voltage output by the secondary side output rectification circuit 3 to the switching transistor control unit PWM Controller, in an embodiment, referring to FIGS. 4 to 6, the synchronous rectification switch power supply further includes a feedback module. The feedback module includes a first feedback unit and a second feedback unit.

The first feedback unit is connected in parallel with the first resistor R1. A first end of the second feedback unit is coupled to a second input end of the switching transistor control unit PWM Controller, and a second end thereof is grounded.

The first feedback unit is configured to transmit a feedback voltage sample to the second feedback unit, and the second feedback unit is configured to transmit the feedback voltage Vfb to the switching transistor control unit PWM Controller. The voltage value of the feedback voltage Vfb is equal to the voltage value of the feedback voltage Vfb.

In an embodiment, the feedback module may be an optocoupler module, and in an example, the first feedback unit is an infrared LED and the second feedback unit is a phototransistor. Of course, the present invention does not limit the specific circuit form of the feedback module, and a person skilled in the art would have chosen other circuit structures to sample and transmit the voltage according to actual situations.

It should be understood that the present invention does not limit the on/off condition of the first switching transistor Q1, and the first switching transistor Q1 may also be closed at a fixed frequency, etc. provided that the technical concept of the present invention is adopted, a tolerance time is introduced, and it is satisfied that before the first switch is closed, the switch control unit PWM Controller can determine whether the first switching transistor Q1 should be turned on/off according to the operating condition of the secondary side output rectification circuit 3, without departing from the protection of the present invention.

In order to better embody the operating effect of the present invention, the operating effect of the synchronous rectification switching power supply circuit of the present invention and the existing switching power supply circuit with synchronous rectification are compared with reference to the waveform diagrams shown in FIGS. 2, 7, 9, and 10.

Figure 7:
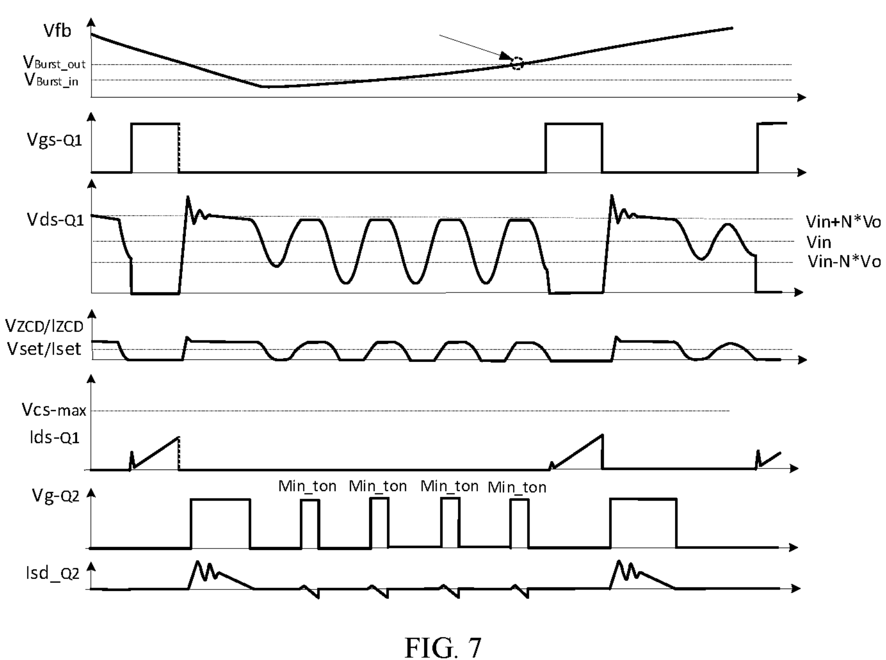
FIG. 7 is a waveform diagram of the synchronous rectification switching power supply circuit of FIG. 4 in the Burst mode.

The waveform diagram is shown in FIG. 7 is the operation effect of the flyback conversion circuit described in FIG. 4 in the Burst mode, and the waveform diagram shown in FIG. 2 is the operation effect diagram of the existing flyback conversion circuit with synchronous rectification in the Burst mode shown in FIG. 1. The detailed description is as follows:

Vfb, a voltage value that can be understood as the voltage value of the feedback voltage;

Vburst_out, which can be understood as a Burst mode exit voltage at which the secondary side output rectification circuit 3 exits the Burst mode;

Vburst_in, which can be understood as a Burst mode entry voltage at which the secondary side output rectification circuit 3 enters the Burst mode;

Vgs-Q1, which can be understood as a gate-source voltage of the first switching transistor Q1;

Vds-Q1, which can be understood as a drain-source voltage of the first switching transistor Q1;

VZCD, which can be understood as the voltage value of the second end of the first voltage dividing resistor Rup;

Vset, which can be understood as a first pre-set voltage value;

Vcs-max, which can be understood as the maximum voltage of the third resistor R3;

Ids-Q1, which can be understood as a drain-source current of the first switching transistor Q1;

Vg-Q2, which can be understood as a gate voltage of the second switching transistor Q2;

Isd_Q2, which can be understood as a source-drain current of the second switching transistor Q2; and Min_ton, which can be understood as the minimum on-time of the second switching transistor Q2.

The current flowing through the second end of the first voltage dividing resistor Rup has a waveform similar to the voltage value of the second end of the first voltage dividing resistor Rup. The first pre-set current has a waveform similar to the waveform of the first pre-set voltage, and the same waveform is shown in FIGS. 7 and 10.

Figure 8:
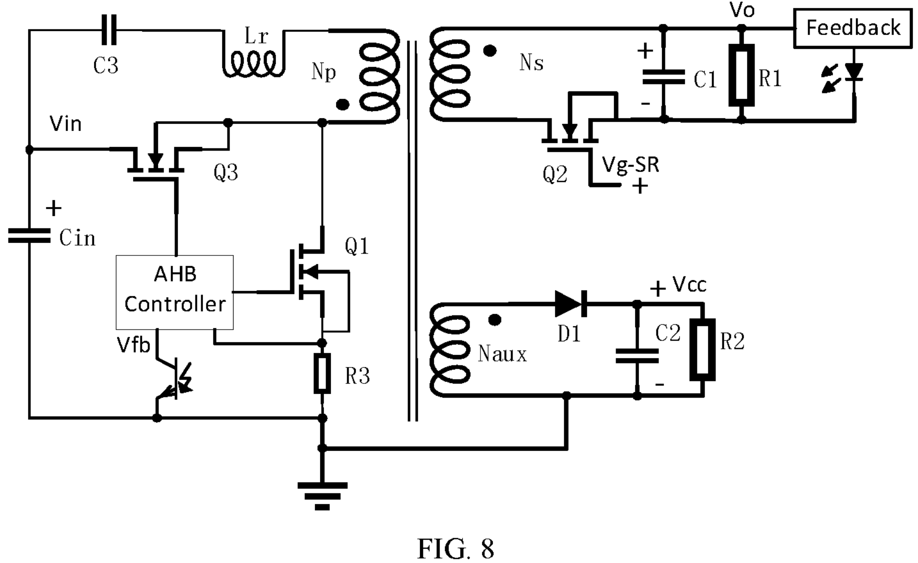
FIG. 8 is a schematic diagram of a configuration of an AHB converter circuit with synchronous rectification in prior art.
Figure 9:
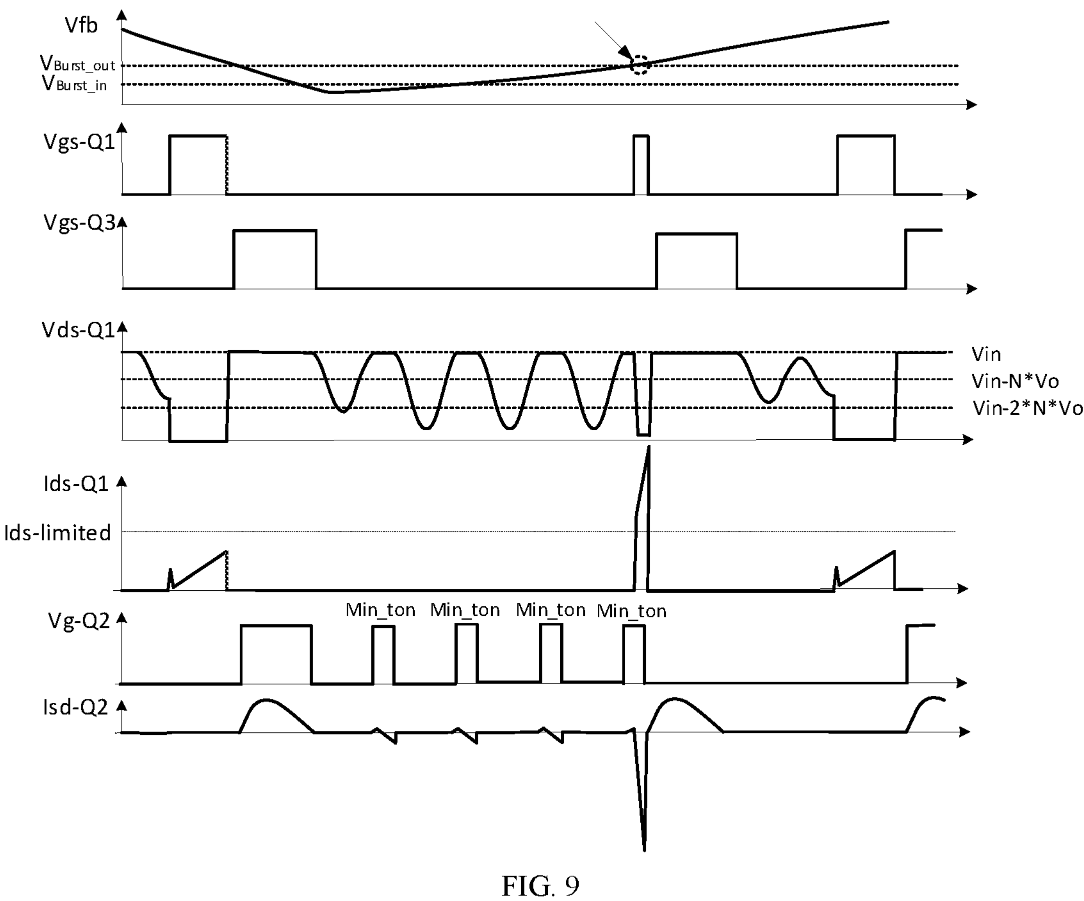
FIG. 9 is a waveform diagram of the AHB conversion circuit with synchronous rectification of FIG. 8 in the Burst mode.
Figure 10:
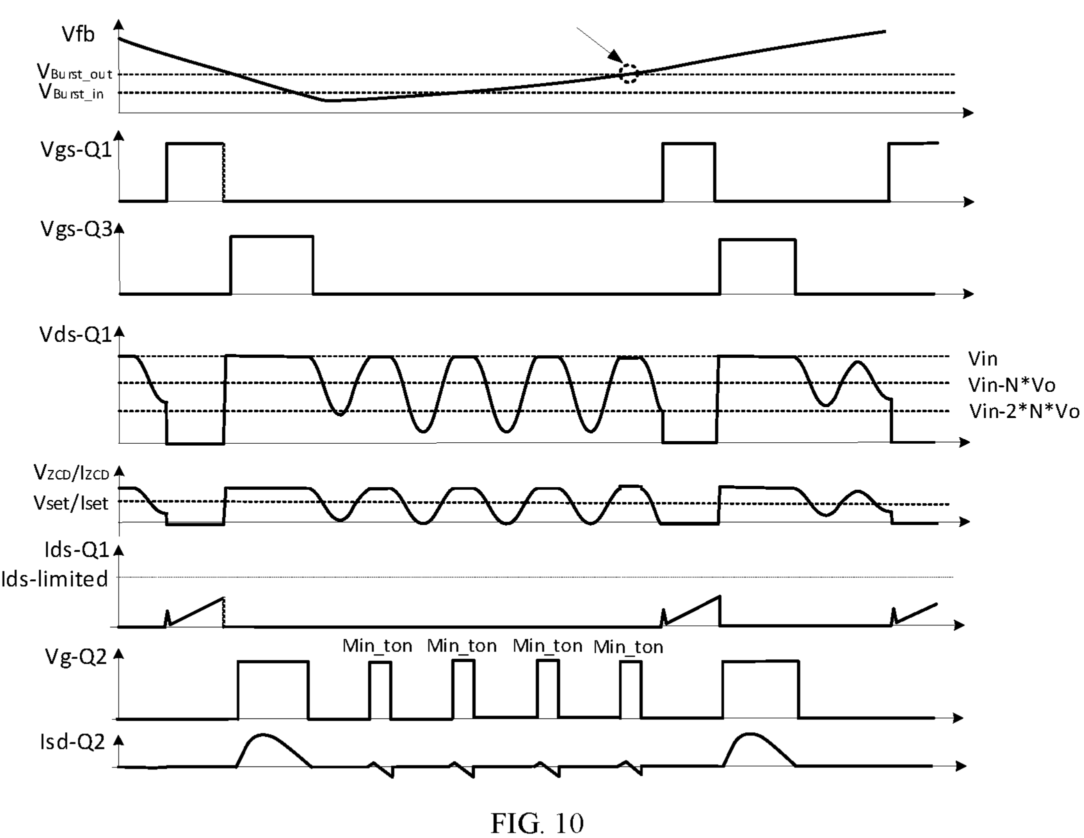
FIG. 10 is a waveform diagram of the synchronous rectification switching power supply circuit of FIG. 5 in the Burst mode.

The waveform diagram shown in FIG. 10 is the operation effect of the AHB conversion circuit with synchronous rectification described in FIG. 5 in the Burst mode, and the waveform diagram shown in FIG. 9 is the operation effect diagram shown in FIG. 8 in the Burst mode. The detailed description is as follows.

Vgs-Q3, which can be understood as a gate-source voltage of the third switching transistor Q3;

With reference to FIGS. 2 and 9, the operating effects of an existing flyback conversion circuit with synchronous rectification (as shown in FIG. 1) and an AHB conversion circuit with synchronous rectification (as shown in FIG. 8) in the Burst mode are respectively shown. When the voltage value Vfb of the feedback voltage received by the switching transistor control unit PWM Controller is greater than or equal to the Burst mode exit voltage, both the flyback conversion circuit with synchronous rectification and the AHB conversion circuit with synchronous rectification will exit the Burst mode. The switching transistor control unit PWM Controller (or the switching transistor control unit AHB Controller) controls the first switching transistor Q1 to be on. If the second switching transistor Q2 is in a conductive state at this moment, the simultaneous conduction of both the primary and secondary side circuits will occur, resulting in break down, component burn-out and the like.

In addition, in the flyback conversion circuit (as shown in FIG. 4) and the AHB conversion circuit with synchronous rectification (as shown in FIG. 5) provided by the present invention, when the voltage value Vfb of the feedback voltage received by the switching transistor control unit PWM Controller is greater than or equal to the Burst mode exit voltage, the first switching transistor Q1 satisfies an on condition. At this moment, the switching transistor control unit PWM Controller (or the switching transistor control unit AHB Controller) controls the first switching transistor Q1 according to the operating condition of the secondary side output rectification circuit 3, specifically:

if the operating condition of the secondary side output rectification circuit 3 is the off state of the second switching transistor Q2, control the first switching transistor Q1 to be on;

if the operating condition of the secondary side output rectification circuit 3 is the on state of the second switching transistor Q2, enter a tolerance state, and detect the operating condition of the secondary side output rectification circuit 3 in real-time within a tolerance time; and if the operating condition of the secondary side output rectification circuit 3 detected within the tolerance time changes to the off state of the second switching transistor Q2, control the first switching transistor Q1 to be on; and if the operating conditions of the secondary side output rectification circuit 3 detected within the tolerance time are all the on states of the second switching transistor Q2, enter a forced-on state at the end of the tolerance time, and control the first switching transistor Q1 to be on.

Similarly, if the operating condition of the secondary side output rectification circuit 3 is the off state of the second switching transistor Q2, the third switching transistor Q3 can also be selectively controlled to be on. The control of the on/off of the third switching transistor Q3 is the same as described above and will not be described again.

Since the LLC resonance conversion circuit has two synchronous rectification outputs respectively corresponding to different primary and secondary switching transistors, it needs to be distinguished. Therefore, the operating effects of the LLC resonance conversion circuit provided by the embodiment of the present invention and the existing LLC resonance conversion circuit are compared with reference to the waveform diagrams shown in FIGS. 12 and 13.

Figure 11:
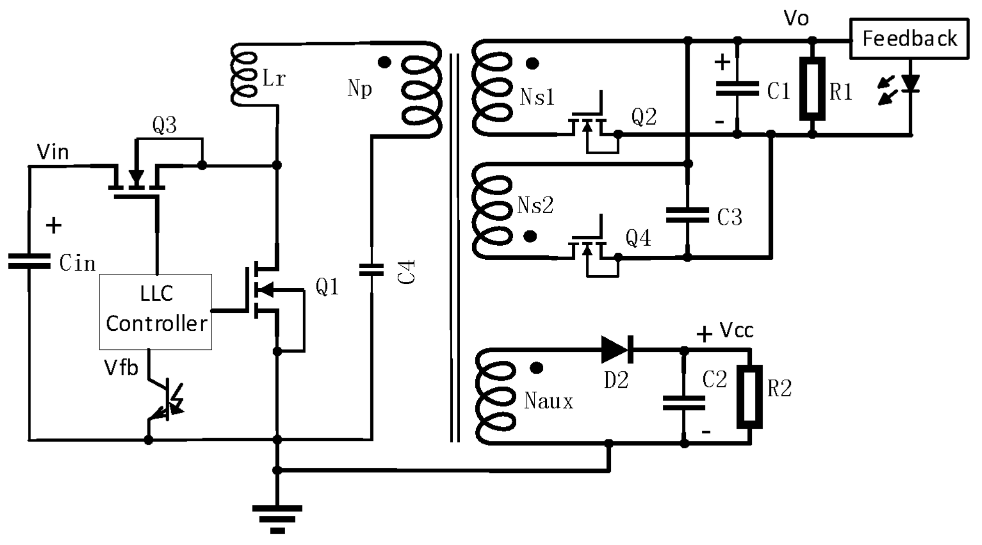
FIG. 11 is a schematic diagram of a configuration of a conventional LLC resonance conversion circuit.
Figure 12:
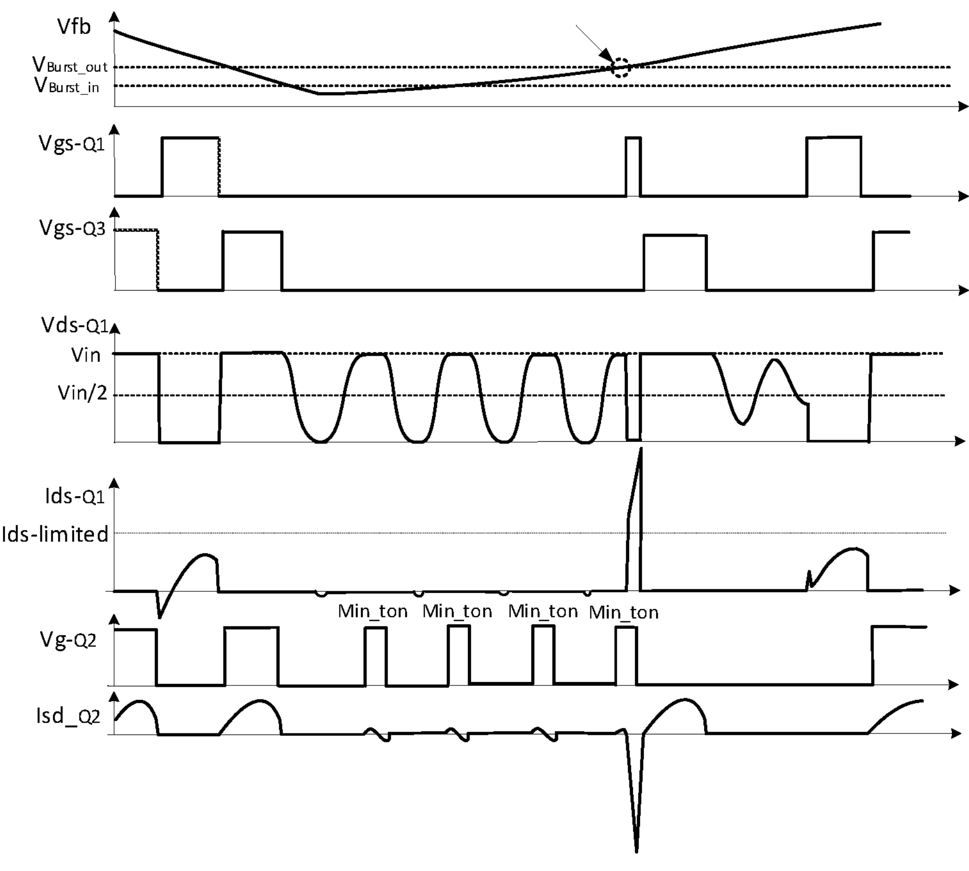
FIG. 12 is a waveform diagram of the conventional LLC resonance conversion circuit of FIG. 11 in the Burst mode.
Figure 13:
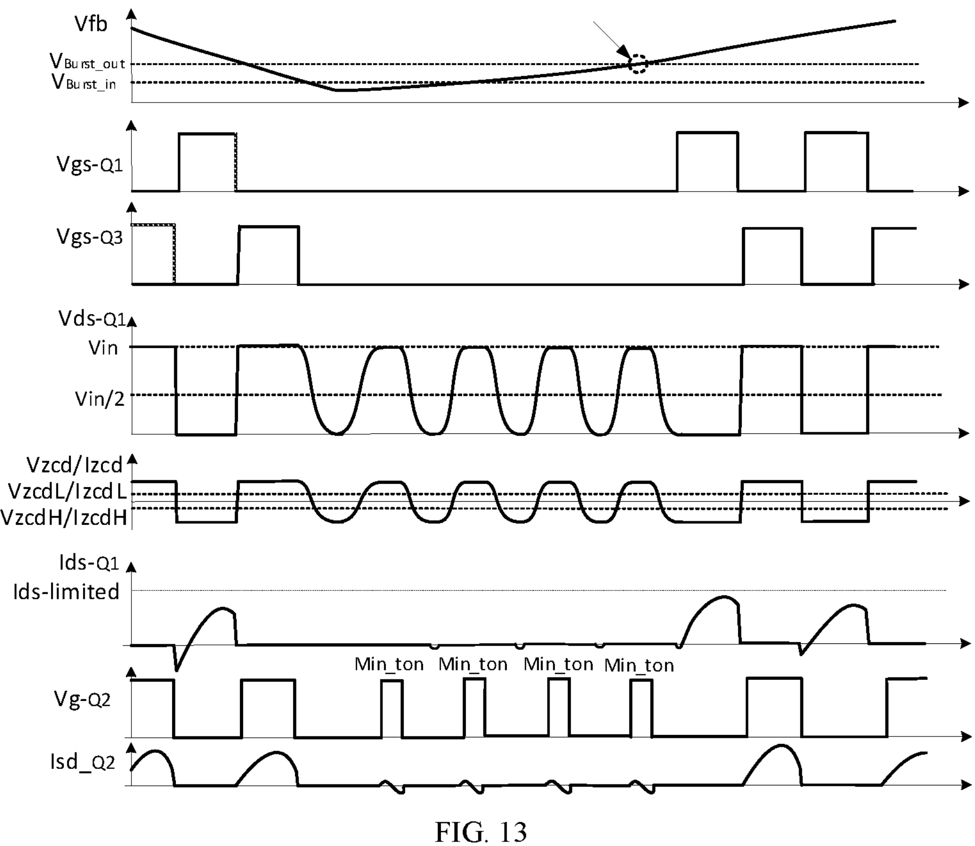
FIG. 13 is a waveform diagram of the synchronous rectification switching power supply circuit of FIG. 6 in the Burst mode.

The waveform diagram shown in FIG. 13 is an operation effect diagram of the LLC resonance conversion circuit shown in FIG. 6 in the Burst mode, and the waveform diagram shown in FIG. 12 is an operation effect diagram of the existing LLC resonance conversion circuit shown in FIG. 11 in the Burst mode. The detailed description is as follows.

Vfb, which can be understood as a voltage value of the feedback voltage Vfb received by the switching transistor control unit LLC Controller;

Vburst_out, which can be understood as a Burst mode exit voltage at which the secondary side output rectification circuit 3 exits the Burst mode;

Vburst_in, which can be understood as a Burst mode entry voltage at which the secondary side output rectification circuit 3 enters the Burst mode;

Vgs-Q1, which can be understood as a gate-source voltage of the first switching transistor Q1;

Vgs-Q3, which can be understood as a gate-source voltage of the third switching transistor Q3;

Vds-Q1, which can be understood as a drain-source voltage of the first switching transistor Q1;

VZCD, which can be understood as the voltage value of the second end of the first voltage dividing resistor Rup;

VzcdL, which can be understood as a first pre-set voltage value;

VzcdH, which can be understood as a second pre-set voltage value;

Ids-Q1, which can be understood as a drain-source current of the first switching transistor Q1;

Ids-limited, which can be understood as the current limit of a drain-source current of the first switching transistor Q1;

Vg-Q2, which can be understood as a gate voltage of the second switching transistor Q2; and Isd_Q2, which can be understood as a source-drain current of the second switching transistor Q2.

The current flowing through the second end of the first voltage dividing resistor Rup has a waveform similar to the voltage value of the second end of the first voltage dividing resistor Rup. The first pre-set current has a waveform similar to the waveform of the first pre-set voltage. The second pre-set current has a waveform similar to the waveform of the second pre-set voltage, which is illustrated by the same waveform in FIG. 13.

With reference to FIG. 12, the operation effect of the existing LLC resonance conversion circuit in the Burst mode is shown, wherein when the voltage value Vfb of the feedback voltage received by the switching transistor control unit LLC Controller is greater than or equal to the Burst mode exit voltage, the existing LLC resonance conversion circuit will exit the Burst mode, and the switching transistor control unit LLC Controller controls the first switching transistor Q1 to be on. If the second switching transistor Q2 is in a conductive state at this moment, the simultaneous conduction of both the primary and secondary side circuits will occur, resulting in break down, component burn-out and the like.

However, in the LLC resonance conversion circuit provided in the present invention, when the voltage value Vfb of the feedback voltage received by the switching transistor control unit LLC Controller is greater than or equal to the Burst mode exit voltage, the first switching transistor Q1 satisfies an on condition. At this moment, the switching transistor control unit LLC Controller controls the first switching transistor Q1 according to the operating condition of the secondary side output rectification circuit 3, specifically:

if the operating condition of the secondary side output rectification circuit 3 is the off state of the second switching transistor Q2, control the first switching transistor Q1 to be on;

if the operating condition of the secondary side output rectification circuit 3 is the on state of the second switching transistor Q2, enter a tolerance state, and detect the operating condition of the secondary side output rectification circuit 3 in real-time within a tolerance time; and if the operating condition of the secondary side output rectification circuit 3 detected within the tolerance time changes to the off state of the second switching transistor Q2, control the first switching transistor Q1 to be on; and if the operating conditions of the secondary side output rectification circuit 3 detected within the tolerance time are all the on states of the second switching transistor Q2, enter a forced-on state at the end of the tolerance time, and control the first switching transistor Q1 to be on.

Similarly, when the third switching transistor Q3 satisfies an on condition, the switching transistor control unit LLC Controller controls the third switching transistor Q3 according to the operating condition of the secondary side output rectification circuit 3, specifically:

if the operating condition of the secondary side output rectification circuit 3 is the off state of the fourth switching transistor Q4, control the third switching transistor Q3 to be on; and if the operating condition of the secondary side output rectification circuit 3 is the on state of the fourth switching transistor Q4, enter a tolerance state, and detect the operating condition of the secondary side output rectification circuit 3 in real-time within a tolerance time, and if the operating condition of the secondary side output rectification circuit 3 detected within the tolerance time changes to the off state of the fourth switching transistor Q4, control the third switching transistor Q3 to be on.

Thus, the synchronous rectification switching power supply circuit provided in the present invention can avoid the conduction of the primary switching transistor during the "on" period of the secondary synchronous rectifier, so as to avoid the problem of simultaneous conduction of the primary side circuit and the secondary side circuit.

In addition, an embodiment of the present invention also provides a control method of the primary switching transistor for controlling the synchronous rectification switching power supply circuit shown in FIGS. 3-6. When the synchronous rectification switching power supply circuit operates in a discontinuous mode, the method including:

monitoring an operating condition of the secondary side output rectification circuit 3 in real-time, and sending the monitored operating condition of the secondary side output rectification circuit 3 to the switching transistor control unit PWM Controller; wherein the operating condition includes at least an on state of the second switching transistor Q2 and an off state of the second switching transistor Q2;

if the operating condition of the secondary side output rectification circuit 3 is the off state of the second switching transistor Q2, controlling the first switching transistor Q1 to be on; and if the operating condition of the secondary side output rectification circuit 3 is the on state of the second switching transistor Q2, controlling the first switching transistor Q1 to be off.

Figure 14:
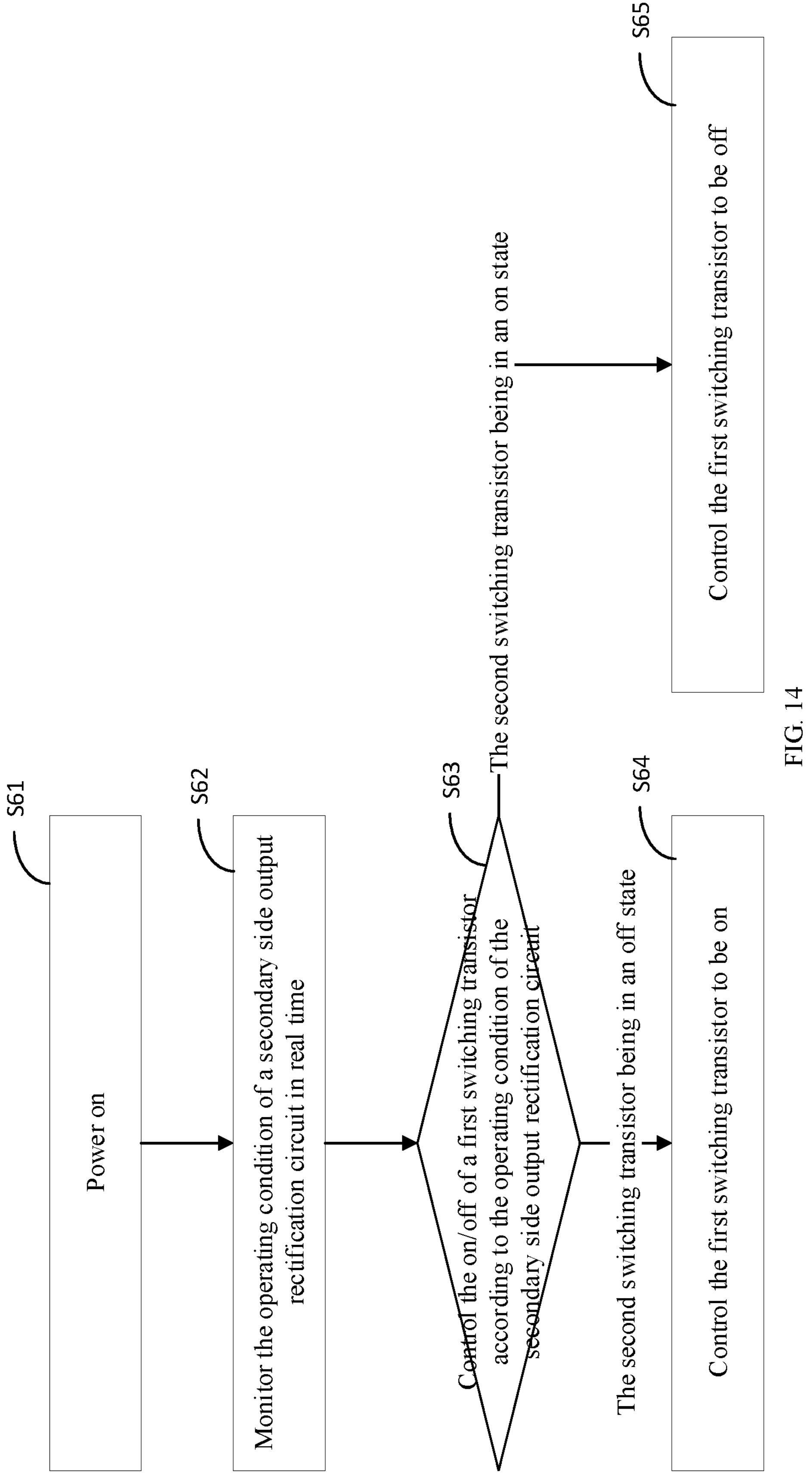
FIG. 14 is a flow chart of a control method of the primary switching transistor shown in FIG. 4.

As a specific embodiment, please refer to FIG. 14. In practical use, the synchronous rectification switching power supply circuit as shown in FIG. 4 provided by an embodiment of the present invention is controlled, and the steps are as follows:

S61: Power on.

Specifically, a voltage signal is present at the voltage input Vin and the synchronous rectification switching power supply circuit operates normally.

S62: Monitoring the operating condition of a secondary side output rectification circuit 3 in real-time.

Specifically, the monitoring circuit 4 monitors the operating condition of the secondary side output rectification circuit 3 in real-time, and sends the monitored operating condition of the secondary side output rectification circuit 3 to the switching transistor control unit PWM Controller. The operating condition includes at least an on state of the second switching transistor Q2 and an off state of the second switching transistor Q2.

S63: Controlling the on/off of the first switching transistor Q1 according to the operating condition of the secondary side output rectification circuit 3; if the second switching transistor Q2 is in the off state, proceeding to S64, and if the second switching transistor Q2 is in the on state, proceeding to S65.

S64: Controlling the first switching transistor Q1 to be on.

Specifically, the switching transistor control unit PWM Controller controls the first switching transistor Q1 to be on and returns to S62.

S65: controlling the first switching transistor Q1 to be off.

Specifically, the switching transistor control unit PWM Controller controls the first switching transistor Q1 to be off and returns to S62.

As a further embodiment, when the first switching transistor Q1 satisfies an on condition, step S65 may also specifically include:

detecting an operating condition of the secondary side output rectification circuit 3 in real-time within a tolerance time, and if the operating condition of the secondary side output rectification circuit 3 detected within the tolerance time becomes the off state of the second switching transistor Q2, proceeding to S64; if the detected operating conditions of the secondary side output rectification circuit 3 within the tolerance time are all the on states of the second switching transistor Q2, proceeding to S64 at the end of the tolerance time.

As another embodiment, step S63 may in particular include: controlling the on/off of the first switching transistor Q1 according to the operating condition of the secondary side output rectification circuit 3; if the second switching transistor Q2 is in the off state, proceeding to S64, and if the second switching transistor Q2 is in a pre-on state, proceeding to S65.

In another specific embodiment, the synchronous rectification switching power supply circuit as shown in FIG. 5 provided by the embodiment of the present invention is controlled, and step S63 may specifically further include:

controlling the on/off of the first switching transistor Q1 or the third switching transistor Q3 according to the operating condition of the secondary side output rectification circuit 3; if the second switching transistor Q2 is in the off state, proceeding to S64, and if the second switching transistor Q2 is in the on state, proceeding to S65.

In this case, steps S64 and S65 may specifically include:

S64: controlling the first switching transistor Q1 or the third switching transistor Q3 to be on.

Specifically, the switching transistor control unit AHB Controller controls the first switching transistor Q1 or the third switching transistor Q3 to be on and returns to S62.

S65: controlling the first switching transistor Q1 or the third switching transistor Q3 to be off.

Specifically, the switching transistor control unit AHB Controller controls the first switching transistor Q1 or the third switching transistor Q3 to be on and returns to S62.

Figure 15:
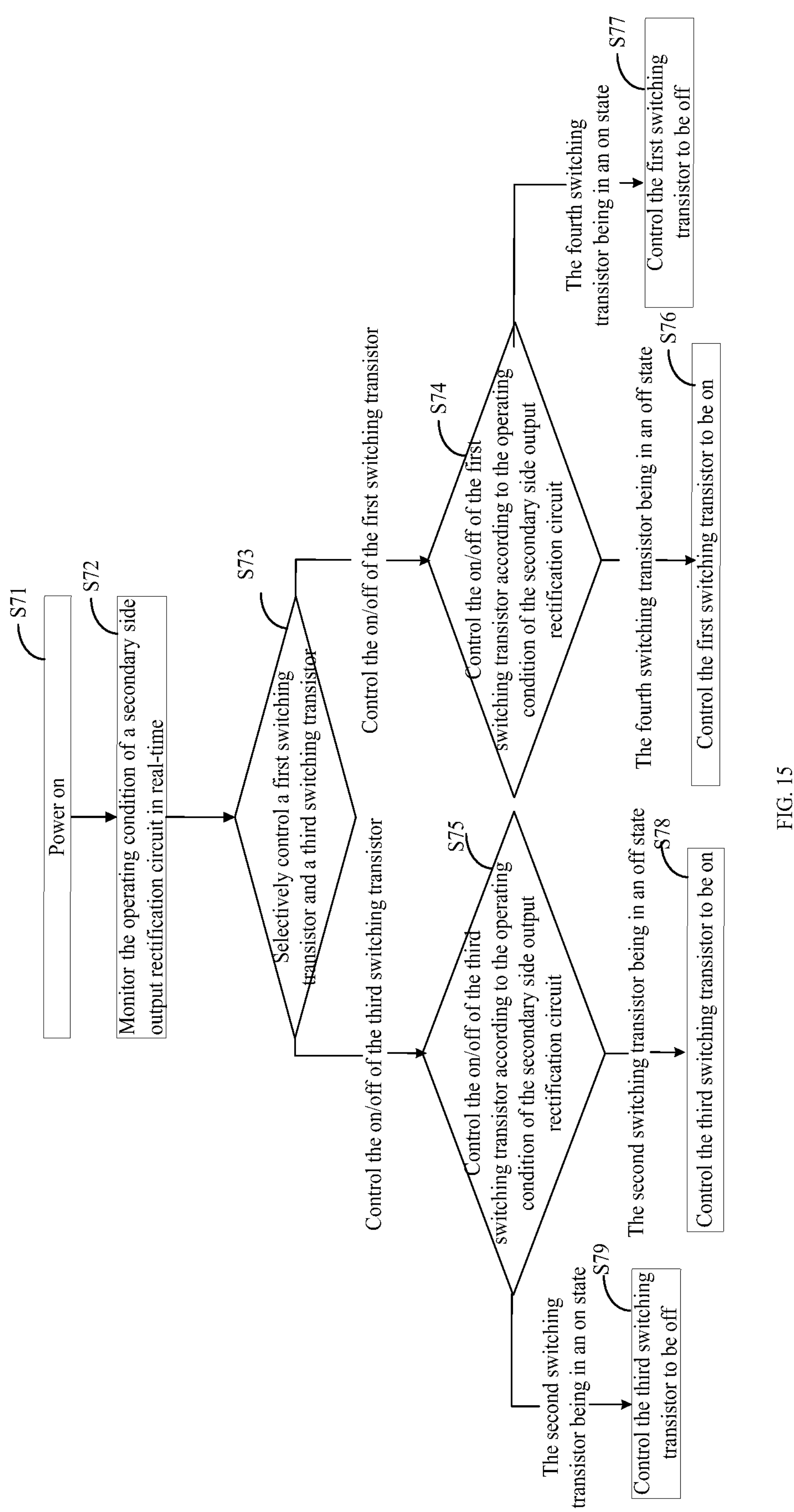
FIG. 15 is a flow chart of a control method of the primary switching transistor shown in FIG. 6.

In another embodiment, referring to FIG. 15, a synchronous rectification switching power supply circuit as shown in FIG. 6 provided by an embodiment of the present invention is controlled, and the steps are as follows:

S71: Power on.

Specifically, a voltage signal is present at the voltage input Vin and the synchronous rectification switching power supply circuit operates normally.

S72: Monitoring the operating condition of a secondary side output rectification circuit 3 in real-time.

Specifically, the monitoring circuit 4 monitors the operating condition of the secondary side output rectification circuit 3 in real-time, and sends the monitored operating condition of the secondary side output rectification circuit 3 to the switching transistor control unit LLC Controller; the operating conditions at least include an on state of the second switching transistor Q2, an off state of the second switching transistor Q2, an on state of the fourth switching transistor Q4 and an off state of the fourth switching transistor Q4.

S73: Selectively controlling the first switching transistor Q1 and the third switching transistor Q3; if it is desired to control the on/off of the first switching transistor Q1, proceeding to S74; if it is desired to control the on/off of the third switching transistor Q3, proceeding to S75.

S74: Controlling the on/off of the first switching transistor Q1 according to the operating condition of the secondary side output rectification circuit 3.

Specifically, if the operating condition of the secondary side output rectification circuit 3 is the off state of the fourth switching transistor Q4, the process proceeds to S76, and if the operating condition is the on state of the fourth switching transistor Q4, the process proceeds to S77.

S74: Controlling the on/off of the third switching transistor Q3 according to the operating condition of the secondary side output rectification circuit 3.

Specifically, if the operating condition of the secondary side output rectification circuit 3 is the off state of the second switching transistor Q2, the process proceeds to S78, and if the operating condition is the on state of the second switching transistor Q2, the process proceeds to S79.

S76: Controlling the first switching transistor Q1 to be on.

Specifically, the switching transistor control unit LLC Controller controls the first switching transistor Q1 to be on, and returns to S72.

S77: Controlling the off of the first switching transistor Q1.

Specifically, the switching transistor control unit LLC Controller controls the first switching transistor Q1 to be off and returns to S72.

S78: Controlling the third switching transistor Q3 to be on.

Specifically, the switching transistor control unit LLC Controller controls the third switching transistor Q3 to be on, and returns to S72.

S79: Controlling the third switching transistor Q3 to be off.

Specifically, the switching transistor control unit LLC Controller controls the third switching transistor Q3 to be off and returns to S72.

Further, an embodiment of the present invention provides a charging device including the synchronous rectification switching power supply circuit described above. By way of example, the device may be a transformer or the like, although other devices requiring power may be used.

In summary, according to the present invention, one end of a first switching transistor is coupled to a transformer, and the other end thereof is grounded. A second end and a third end of the transformer are respectively coupled to a first end of the first capacitor and a first end of the second switching transistor. A second end of a second switching transistor is coupled to a second end of a first capacitor. A first resistor is connected in parallel with the first capacitor. A monitoring circuit is coupled to the switching transistor control unit in such a manner that the operating condition of the secondary side output rectification circuit is monitored in real-time by the monitoring circuit. When the operating condition of the secondary side output rectification circuit is an off state of the second switching transistor, the switching transistor control unit controls the switch to be on, and when the operating condition of the secondary side output rectification circuit is an on state of the second switching transistor, the switching transistor control unit controls the switch to be off. Thus, it is possible to avoid the conduction of the primary switching transistor during the "on" period of the secondary synchronous rectifier and to avoid the problem of simultaneous conduction of both the primary and secondary circuits.

Finally, it should be noted that the embodiments above are only used to illustrate the technical solution of the present invention and not to limit it. Although the present invention has been described in detail with reference to the aforementioned various embodiments, ordinary technical personnel in the art should understand that they can still modify the technical solutions recorded in the aforementioned embodiments, or equivalently replace some or all of the technical features. These modifications or substitutions do not separate the essence of the corresponding technical solutions from the scope of the technical solutions of the various embodiments of the present invention.

The invention claimed is:

1. A synchronous rectification switching power supply circuit, comprising, when operating in a discontinuous mode: a primary side input circuit, a transformer, a secondary side output rectification circuit, and a monitoring circuit; wherein the primary side input circuit comprises a switching transistor control unit and a first switching transistor, and the secondary side output rectification circuit comprises a second switching transistor, a first capacitor, and a first resistor;

an output end of the switching transistor control unit is coupled to a control end of the first switching transistor; a first end of the first switching transistor is coupled to a first end of the transformer; a second end of the first switching transistor is grounded; a second end of the transformer is coupled to a first end of the first capacitor; a third end of the transformer is coupled to a first end of the second switching transistor; a second end of the second switching transistor is coupled to a second end of the first capacitor; a control end of the second switching transistor receives a second drive voltage; the first resistor is connected in parallel with the first capacitor; the monitoring circuit is coupled to a first input end of the switching transistor control unit; wherein:

the monitoring circuit is configured to monitor an operating condition of the secondary side output rectification circuit in real-time, and send the monitored operating condition of the secondary side output rectification circuit to the switching transistor control unit; the operating condition comprises at least an on state of the second switching transistor and an off state of the second switching transistor;

the switching transistor control unit is configured to:

if the operating condition of the secondary side output rectification circuit is the off state of the second switching transistor, control the first switching transistor to be on; and if the operating condition of the secondary side output rectification circuit is the on state of the second switching transistor, control the first switching transistor to be off.

2. The synchronous rectification switching power supply circuit according to claim 1, wherein the transformer comprises a primary winding and a first secondary winding;

a first output end of the primary winding is coupled to the first end of the first switching transistor, an output end of the primary winding is coupled to an input end of the first secondary winding, and a first output end and a second output end of the first secondary winding are respectively coupled to the first end of the first capacitor and the first end of the second switching transistor.

3. The synchronous rectification switching power supply circuit according to claim 2, wherein the monitoring circuit comprises an auxiliary winding, a first diode, a second capacitor, a second resistor, a first voltage dividing resistor, and a second voltage dividing resistor; wherein:

a first end of the auxiliary winding is coupled to the output end of the primary winding;

an anode of the first diode and a first end of the first voltage dividing resistor are coupled to a first output end of the auxiliary winding; a cathode of the first diode is coupled to a first end of the second capacitor; the second capacitor is connected in parallel with the second resistor; a second end of the second capacitor is grounded; a second end of the first voltage dividing resistor is respectively coupled to a first end of the second voltage dividing resistor and the first input end of the switching transistor control unit; a second end of the second voltage dividing resistor is coupled to a second output end of the auxiliary winding; and a second end of the second voltage dividing resistor is grounded;

wherein the operating condition of the secondary side output rectification circuit is characterized by the voltage value and/or current value of the second end of the first voltage dividing resistor.

4. The synchronous rectification switching power supply circuit according to claim 3, wherein the operating condition of the secondary side output rectification circuit is characterized by the voltage value and/or current value of the second end of the first voltage dividing resistor, specifically:

if the voltage value and/or current value of the second end of the first voltage dividing resistor is within a corresponding pre-set voltage value range and/or pre-set current value range, it is characterized that the operating condition of the secondary side output rectification circuit is the off state of the second switching transistor; and if the voltage value and/or current value of the second end of the first voltage dividing resistor is not within the corresponding range of the pre-set voltage value and/or the pre-set current value, it is characterized that the operating condition of the secondary side output rectification circuit is the on state of the second switching transistor.

5. The synchronous rectification switching power supply circuit according to claim 4, wherein the primary side input circuit is a flyback conversion circuit; the primary side input circuit further comprises a third resistor; wherein a first end of the third resistor is coupled to the second end of the first switching transistor, and a second end of the third resistor is grounded.

6. The synchronous rectification switching power supply circuit according to claim 5, wherein the flyback conversion circuit is an AHB flyback conversion circuit; the primary side input circuit further comprises a third switching transistor; wherein a control end of the third switching transistor is coupled to a second output end of the switching transistor control unit, a first end of the third switching transistor and a first end of the first switching transistor are respectively coupled to the first output end of the primary winding, and a second end of the third switching transistor is grounded via a power supply side capacitor.

7. The synchronous rectification switching power supply circuit according to claim 6, wherein the operating condition of the secondary side output rectification circuit is characterized by the voltage value and/or current value of the second end of the first voltage dividing resistor, specifically:

if the voltage value and/or current value of the second end of the first voltage dividing resistor is less than or equal to a first pre-set voltage value and/or first pre-set current value, it is characterized that the operating condition of the secondary side output rectification circuit is the off state of the second switching transistor; and if the voltage value and/or current value of the second end of the first voltage dividing resistor is greater than the first pre-set voltage value and/or the first pre-set current value, it is characterized that the operating condition of the secondary side output rectification circuit is the on state of the second switching transistor.

8. The synchronous rectification switching power supply circuit according to claim 5, wherein the operating condition of the secondary side output rectification circuit is characterized by the voltage value and/or current value of the second end of the first voltage dividing resistor, specifically:

if the voltage value and/or current value of the second end of the first voltage dividing resistor is less than or equal to a first pre-set voltage value and/or first pre-set current value, it is characterized that the operating condition of the secondary side output rectification circuit is the off state of the second switching transistor; and if the voltage value and/or current value of the second end of the first voltage dividing resistor is greater than the first pre-set voltage value and/or the first pre-set current value, it is characterized that the operating condition of the secondary side output rectification circuit is the on state of the second switching transistor.

9. The synchronous rectification switching power supply circuit according to claim 4, wherein the primary side input circuit is an LLC resonance conversion circuit; the primary side input circuit further comprises a third switching transistor; wherein the control end of the third switching transistor is coupled to the second output end of the switching transistor control unit, the first end of the third switching transistor and the first end of the first switching transistor are respectively coupled to a second output end of the primary winding, and the second end of the third switching transistor is grounded via the power supply side capacitor.

10. The synchronous rectification switching power supply circuit according to claim 9, wherein the transformer further comprises a second secondary winding, and the secondary side output rectification circuit further comprises a third capacitor and a fourth switching transistor; wherein a first end of the third capacitor is respectively coupled to a first output end of a second secondary winding and the first end of the first capacitor; a first end of the fourth switching transistor is coupled to the second output end of the second secondary winding; a second end of the fourth switching transistor is respectively coupled to a second end of the third capacitor and the second end of the first resistor, and a control end of the fourth switching transistor receives a fourth drive voltage.

11. The synchronous rectification switching power supply circuit according to claim 10, wherein the operating condition further comprises an on state of the fourth switching transistor and an off state of the fourth switching transistor; the operating condition of the secondary side output rectification circuit is characterized by the voltage value and/or current value of the second end of the first voltage dividing resistor, specifically:

if the voltage value and/or current value of the second end of the first voltage dividing resistor is less than or equal to the first pre-set voltage value and/or the first pre-set current value, it is characterized that the operating condition of the secondary side output rectification circuit is the off state of the fourth switching transistor;

if the voltage value and/or current value of the second end of the first voltage dividing resistor is greater than the first pre-set voltage value and/or the first pre-set current value, it is characterized that the operating condition of the secondary side output rectification circuit is the on state of the fourth switching transistor;

the voltage value and/or current value of the second end of the first voltage dividing resistor is greater than or equal to a second pre-set voltage value and/or the first pre-set current value, it is characterized that the operating condition of the secondary side output rectification circuit is the off state of the second switching transistor; and the voltage value and/or current value of the second end of the first voltage dividing resistor is less than the corresponding the first pre-set voltage value and/or the first pre-set current value, it is characterized that the operating condition of the secondary side output rectification circuit is the on state of the second switching transistor.

12. The synchronous rectification switching power supply circuit according to claim 3, wherein the operating condition further comprises a pre-on state of the second switching transistor.

13. The synchronous rectification switching power supply circuit according to claim 12, wherein the switching transistor control unit is further configured to:

if the operating condition of the secondary side output rectification circuit is the pre-on state of the second switching transistor, control the first switching transistor to be off.

14. The synchronous rectification switching power supply circuit according to claim 13, wherein the operating condition of the secondary side output rectification circuit is characterized by a rising slope or a falling slope of the voltage and/or a rising slope or a falling slope of the current at the second end of the first voltage dividing resistor, specifically:

if the rising slope of the voltage at the second end of the first voltage dividing resistor is greater than or equal to a first pre-set slope, or the falling slope is greater than or equal to a second pre-set slope, and/or the rising slope of the current is greater than or equal to a third pre-set slope, or the falling slope is greater than or equal to a fourth pre-set slope, it is characterized that the operating condition of the secondary side output rectification circuit is the pre-on state of the second switching transistor.

15. The synchronous rectification switching power supply circuit according to claim 1, further comprising a feedback module; wherein the feedback module comprises a first feedback unit and a second feedback unit;

the first feedback unit is connected in parallel with the first resistor, a first end of the second feedback unit is coupled to a second input end of the switching transistor control unit, and a second end of the second feedback unit is grounded;

wherein the first feedback unit is configured to transmit a feedback voltage sample to the second feedback unit, and the second feedback unit is configured to transmit the feedback voltage to the switching transistor control unit, wherein the voltage value of the feedback voltage is equal to the voltage value of the voltage output by the secondary side output rectification circuit.

16. The synchronous rectification switching power supply circuit according to claim 15, wherein the switching transistor control unit is further configured to:

in the case where the voltage value of the feedback voltage received by the switching transistor control unit is greater than or equal to a Burst mode exit voltage:

if the operating condition of the secondary side output rectification circuit is the off state of the second switching transistor, control the first switching transistor to be on; and if the operating condition of the secondary side output rectification circuit is the on state of the second switching transistor, enter a tolerance state, and detect the operating condition of the secondary side output rectification circuit in real-time within a tolerance time; and if the operating condition of the secondary side output rectification circuit detected within the tolerance time changes to the off state of the second switching transistor, control the first switching transistor to be on; and if the operating conditions of the secondary side output rectification circuit detected within the tolerance time are all the on states of the second switching transistor, enter a forced-on state at the end of the tolerance time, and control the first switching transistor to be on.

17. A control method of a primary switching transistor, for controlling the synchronous rectification switching power supply circuit according to claim 16 that is operated in a discontinuous mode, the method comprising:

monitoring an operating condition of the secondary side output rectification circuit in real-time, and sending the monitored operating condition of the secondary side output rectification circuit to the switching transistor control unit; wherein the operating condition comprises at least an on state of the second switching transistor and an off state of the second switching transistor;

if the operating condition of the secondary side output rectification circuit is the off state of the second switching transistor, controlling the first switching transistor to be on; and if the operating condition of the secondary side output rectification circuit is the on state of the second switching transistor, controlling the first switching transistor to be off.

18. An electronic device comprising the synchronous rectification switching power supply circuit according to claim 16.

19. A control method of a primary switching transistor, for controlling the synchronous rectification switching power supply circuit according to claim 1 that is operated in a discontinuous mode, the method comprising:

monitoring an operating condition of the secondary side output rectification circuit in real-time, and sending the monitored operating condition of the secondary side output rectification circuit to the switching transistor control unit; wherein the operating condition comprises at least an on state of the second switching transistor and an off state of the second switching transistor;

if the operating condition of the secondary side output rectification circuit is the off state of the second switching transistor, controlling the first switching transistor to be on; and if the operating condition of the secondary side output rectification circuit is the on state of the second switching transistor, controlling the first switching transistor to be off.

20. An electronic device comprising the synchronous rectification switching power supply circuit according to claim 1.

* * * * *